(Model.)
D. B. WIRT.
MOUSE TRAP.
No. 308,394. Patented Nov. 25, 1884.
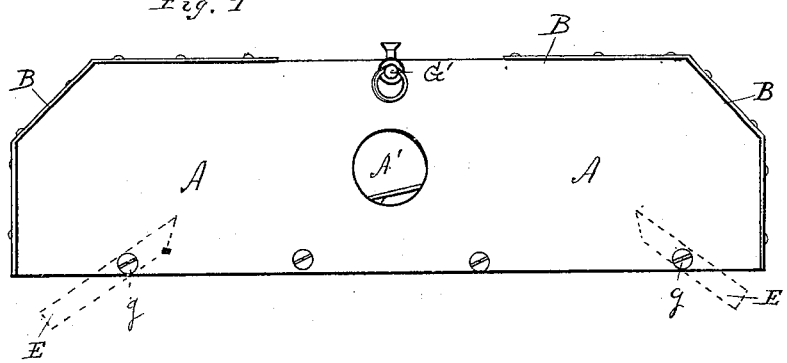
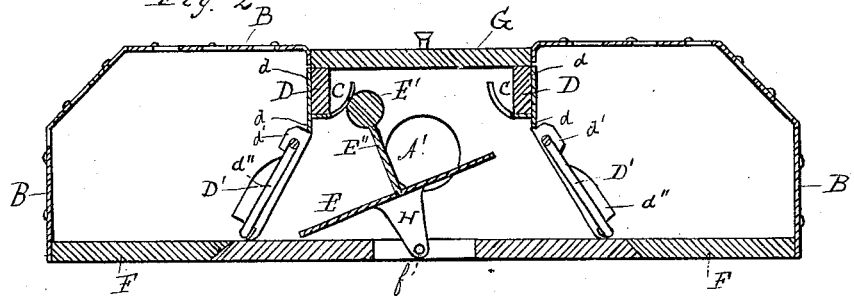
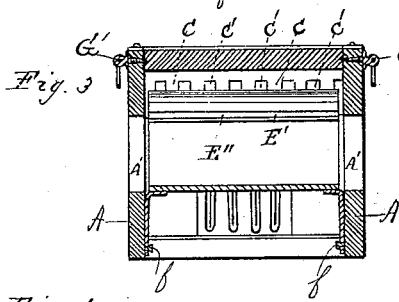 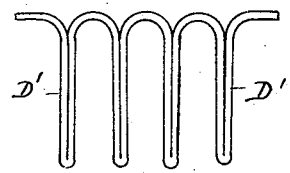
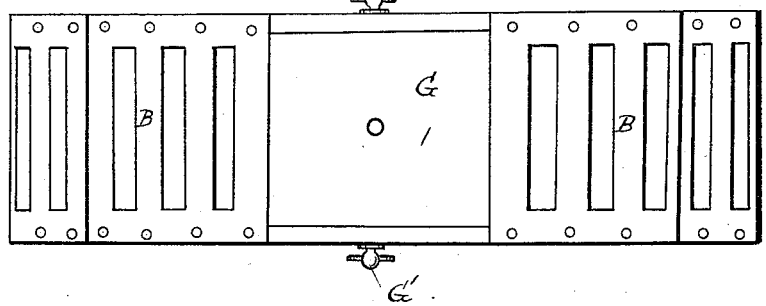
WITNESSES
Morton Toulmin
M. D. Murphy
INVENTOR
Dian B. Wirt
W. H. Wills & Co.
Attorney

UNITED STATES PATENT OFFICE.

DIAN B. WIRT, OF HASTINGS, NEBRASKA.

MOUSE-TRAP.

SPECIFICATION forming part of Letters Patent No. 308,394, dated November 25, 1884.

Application filed May 27, 1884. (Model.)

*To all whom it may concern:*

Be it known that I, DIAN B. WIRT, a citizen of the United States, residing at Hastings, in the county of Adams and State of Nebraska, have invented certain new and useful Improvements in Rat and Mouse Traps, of which the following is a specification, reference being had therein to the accompanying drawings.

This invention relates to improvements in mouse and rat traps, and has for its object to produce an efficient contrivance to capture rats or mice. This object is attained by the device illustrated in the accompanying drawings, forming a part of this specification, in which—

Figure 1 is a side elevation. Fig. 2 is a longitudinal section. Fig. 3 is a transverse section. Fig. 4 is a plan view. Fig. 5 is a detailed view of the wire swing-gate D.

The letter A indicates the sides of the trap. The letter A' indicates openings, of which there is one on each side of the trap, by which the rat or mouse passes to the inside thereof.

B are perforated pieces of sheet metal, forming a part of the top and the ends of the trap.

C are racks to hold bait, and are made of sheet metal cut into strips, so as to leave openings C', which permit the animals to see the bait, and are located on each side of a central opening in the top of the trap, covered by a removable lid or shutter, G, which is secured to the sides A by the screws G', having rings, by means of which they may be readily unscrewed when it is desired to remove the cover.

D are partitions of wood having a lining of sheet metal, d, which extend downwardly in an angular direction to the floor of the trap, and is provided with an opening in the center to receive the gate, and with lugs d', which serve the purpose of bearings for the swinging gates D', which are each made of a single piece of wire bent into the shape shown in Fig. 5. The wings d'' are to prevent the escape of the mice by lifting the gates from the sides which separate the central chamber from the parts at each end forming the trap.

E is a trip having a top, E', loaded to give it the desired weight to prevent it being turned by the rat or mouse until the animal has entered entirely within the central chamber of the trap. The tilt consists of a platform, E, having a perpendicular partition, E'', surmounted by the weighted portion E'.

Projecting from the bottom of the platform E are lugs H, which are pivoted to the sides of the trap by the pivots *f*, which enable it to tilt from one side to the other, according to the position of the animal when entering either of the openings A'.

F are doors at the bottom of the trap, one of which is at each end thereof, and are secured by the pivots *g* to the sides of the trap, by means of which it may be swung open, and thus permit the rat or mouse to be removed from the interior of the trap. When a rat or mouse enters one of the openings A' and rests upon the platform E, it tilts over to that side, and the weight E' holds it in an inclined position, and in trying to get out he goes through one of the doors in the partitions D into the trap or chamber at that end of the device.

Having described my invention, what I desire to secure by Letters Patent and to claim is—

In a mouse-trap having sheet-metal lining *d*, wings *d''*, and lugs *d'*, the combination of gates D', made of a single piece of wire bent into form, as shown and described, and for the purposes set forth.

In testimony whereof I affix my signature in presence of two witnesses.

DIAN B. WIRT.

Witnesses:
  GEO. F. WORK,
  DAVID S. TAGGART.